Dec. 1, 1925.

E. W. BREISCH 1,563,330

MERCURY RECTIFIER STARTING DEVICE

Filed Aug. 17, 1920

WITNESSES:
J. A. Helsel.
W. R. Coley

INVENTOR
Edgar W. Breisch
BY
Wesley G. Carr
ATTORNEY

Patented Dec. 1, 1925.

1,563,330

UNITED STATES PATENT OFFICE.

EDGAR W. BREISCH, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MERCURY-RECTIFIER STARTING DEVICE.

Application filed August 17, 1920. Serial No. 404,251.

To all whom it may concern:

Be it known that I, EDGAR W. BREISCH, a citizen of the United States, and a resident of Edgewood Park, in the county of Allegheny and State of Pennsylvania, have invented a new and useful Improvement in Mercury-Rectifier Starting Devices, of which the following is a specification.

My invention relates to mercury rectifiers and it has particular relation to devices for starting such rectifiers.

The object of my invention is to provide a starting device for a mercury rectifier that shall be of relatively simple and economical construction and of great durability and which shall be effective and positive in operation.

The common method of starting a mercury rectifier bulb is to tilt it until the mercury pools come together and then to allow it to swing back in order to separate the pools. I have observed that, when the contact between the pools is slowly broken, there is a tendency for the bulb to start rectifying much sooner than when the tilting is fast and violent.

By my invention, I provide an effective and reliable means for automatically starting a mercury rectifier, which may be relatively remote from the operator.

Briefly speaking my invention consists in providing a starting device comprising a motor, a gear-reduction device for slowly tilting a rectifier and a motor-control system for energizing the motor in accordance with the electrical conditions of the mercury rectifier.

Figure 1:
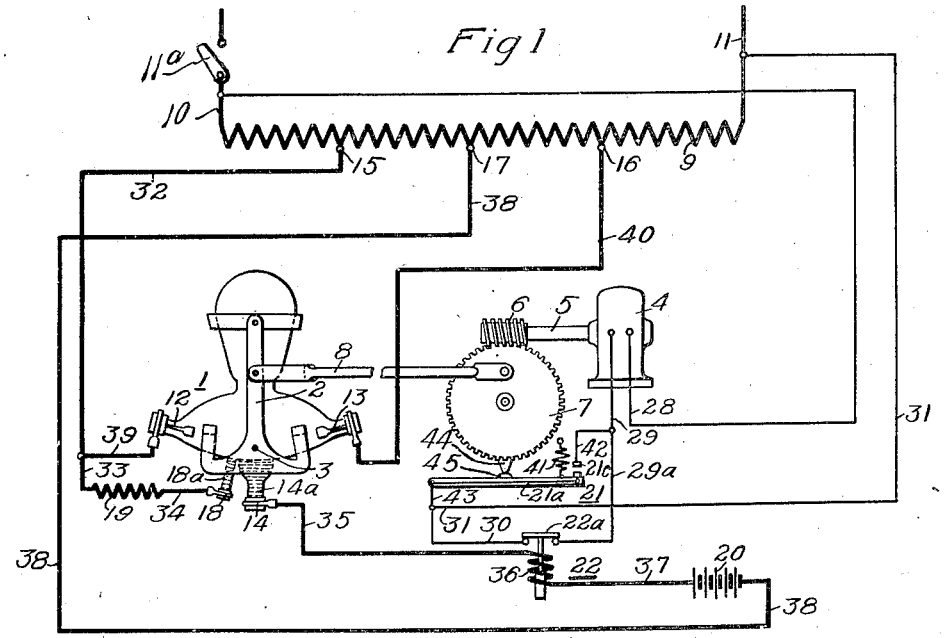

Reference may now be made to the accompanying drawings, Fig. 1 of which is a diagrammatic view of a mercury rectifier provided with a starting device and a motor-control system constructed in accordance with my invention.

Figure 2:
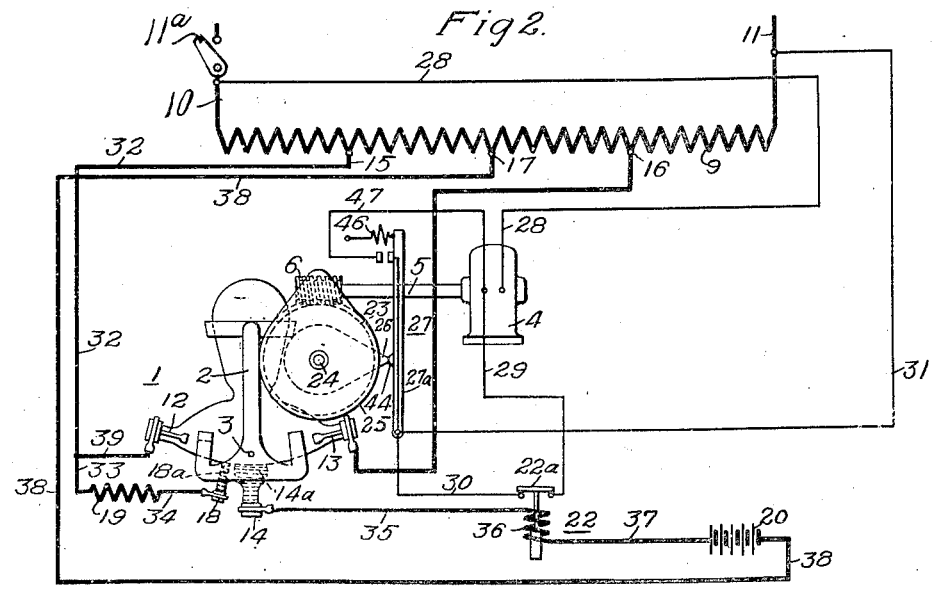

Fig. 2 is a diagrammatic view of a mercury rectifier provided with a modified form of starting device and motor-control system constructed in accordance with my invention.

In Fig. 1, I show a mercury rectifier or vapor converter 1 mounted in a frame 2, which is pivotally supported by trunnions 3 (only one of which is shown). A motor 4 is directly connected, by a rotatable shaft 5, to a worm 6 which drives a gear 7. The gear 7 actuates the frame 2 by means of a bar or shaft 8 which is pivotally connected to each.

The mercury rectifier is supplied with electrical energy by an auto-transformer 9 which is connected to a source of alternating current by line conductors 10 and 11 and line switch 11a.

The mercury rectifier 1 has its anodes 12 and 13 and cathode 14 electrically connected to the auto-transformer's secondary terminals 15, 16 and 17, respectively. An auxiliary or starting anode 18 and a resistor 19 are connected in series to the auto-transformer terminal 15.

Direct current from the cathode 14 is employed for energizing a load 20, such, for example, as a plurality of storage batteries.

The circuits for energizing the motor 4 are controlled by contactors 21 and 22, as hereinafter described.

Referring to Fig. 2, the parts of the system that are similar to those shown in Fig. 1 are designated by like numerals. The motor 4 drives the worm 6 which turns a gear 23 (shown by broken lines) which is fixedly mounted on a rotatable shaft 24. A cam 25 is positioned on the shaft 24 and is driven thereby. When the cam 25 rotates, it slowly oscillates the frame 2 which holds the mercury rectifier 1. An auxiliary cam 26 (shown by broken lines) is securely mounted upon the shaft 24 and actuates the contactor 27 when the shaft 24 rotates.

The operation of the starting device shown in Fig. 1 begins when the line conductors 10 and 11 and auto-transformer 9 are electrically energized by the closing of the line switch 11a.

A circuit is established from the line conductor 10, through conductor 28, the motor 4, conductors 29 and 29a, contact disk 22a of the contactor 22, which is normally in its closed position, conductors 30 and 31, to the line conductor 11. The completion of the circuit through the motor 4 and the contactor 22 causes the motor 4 to drive the shaft 5 and the worm 6 which, in turn, rotates the gear 7. It is apparent that the speed of the motor 4 may be made much greater than that of the gear 7.

The rotation of the gear 7 causes the arm 8 to rock or to tilt the frame 2. By having a relatively long arm or shaft 8 and mounting it close to the center of the gear 7, slight movement of the frame 2 may be obtained. The movement of the frame 2 first effects a union of the mercury pools 14a and 18a of the cathode 14 and the auxiliary anode 18, respectively, then slowly separates them, causing an arc. It is the relatively slow separation of the pools that ensures effective starting of the rectifier.

When the mercury pools 14a and 18a unite, an electrical circuit is established from the terminal 15 of the auto-transformer 15 through conductors 32 and 33, resistor 19, conductor 34, auxiliary anode 18, mercury pools 18a and 14a, cathode 14, conductor 35, actuating coil 36 of the contactor 22, conductor 37, batteries 20 and conductor 38 to the auto-transformer's secondary terminal 17.

When the mercury rectifier 1 is slowly oscillated by the motor 4 and the connecting gearing, an arc is established from the starting anode 18 to the cathode 14, thereby starting arcs from the anodes 12 and 13 to the cathode 14. The anode 12 is connected to the auto-transformer terminal 15 by conductors 32 and 39, and the anode 13 is connected to the auto-transformer terminal 16 by conductor 40.

When the actuating coil 36 is energized by the operation of the rectifier 1, the contact disk 22a of the contactor 22 is actuated from its closed position, thereby breaking the circuit through the motor 4. The circuit will remain broken as long as the rectifier 1 continues to operate.

The breaking of the circuit through the contact disk 22a will de-energize the motor 4, if contactor 21 is in an open position. However, the contact arm 21a is normally maintained in a closed position by the spring 41, thereby establishing a circuit from line conductor 10, through conductor 28, the motor 4, conductors 29 and 42, contact arm 21a and conductors 43 and 31, to line conductor 11.

The contactor 21 is opened by a lug 44, which projects from the gear wheel 7, so engaging a projecting portion 45 of the arm 21a that the contact arm 21a is forced outwardly from the contact terminal 21c. The lug 44 is so positioned on the gear wheel 7 that it opens the contactor 21 at the same time that the rectifier 1 is in its vertical position.

It is apparent that, by employing two parallel circuits to energize the motor 4— one of the circuits having a contactor 22 which is normally closed, unless the mercury rectifier 1 is in operation and the other circuit having a contactor which is only open when the rectifier 1 is in a vertical position— it will always be possible to start the rectifier 1 and the starting operation will not cease until the rectifier is brought to an upright position.

The operation of the starting device for the rectifier shown in Fig. 2 is the same as has been described for the apparatus shown in Fig. 1 except that the frame 2 in which the rectifier 1 is mounted is oscillated by the cam 25, and the contactor 27, which corresponds to contactor 21, is opened by the auxiliary cam 26.

The cam 25 is so designed that the rectifier 1 will assume an upright position when the cam 25 is in the position shown in the drawing, in which position the auxiliary cam 26 opens the contactor 27. The opening of the contactor 27 will de-energize the motor 4, provided the contactor 22 is in its open position, because of the energization of the actuating coil 36 of the contactor 22 by the rectifier 1.

If the rectifier 1 is not in a vertical position, the contactor 27 will be held closed by the spring 46, and a circuit will be established from line conductor 10, through conductor 28, the motor 4, conductor 47, contact arm 27a and conductor 31, to line conductor 11.

It will be observed by those skilled in the art that apparatus embodying my invention is so arranged that the motor will continue to operate until the rectifier is started and will only cease to operate when the rectifier is brought to a vertical position.

While I have shown preferred forms of my invention, it may be subjected to modifications in structural details and in the method of arranging circuits. I desire, therefore, to be limited only by the scope of the appended claims.

I claim as my invention:

1. The combination with a vapor rectifier adapted to be started by tilting, of a rotating electric starting motor therefor, and means for translating the continuous rotary movement of said motor into a tilting movement of said rectifier.

2. The combination with a vapor rectifier adapted to be started by tilting, of a rotating electric starting motor therefor, a source of energy for said motor, means for translating the continuous rotary movement of said motor into a cyclic rocking movement of said rectifier, means responsive to the starting of the rectifier for a de-energizing said motor and means for causing said motor to stop only in predetermined positions after the initial actuation of said de-energizing means.

3. The combination with a vapor rectifier adapted to be started by tilting, of a rotating electric starting motor therefor, means for translating the continuous rotary movement of said motor into a cyclic rocking movement of said rectifier, and means responsive to the starting of the rectifier for causing the same to assume its normal operating position.

4. The combination with a vapor converter, of a rotating electric motor, a translating device driven by said motor for tilting said converter, a plurality of circuits for continuously energizing said motor, and a contactor in each circuit, one of said contactors being controlled by said translating device and another contactor being controlled by the electrical condition of said rectifier.

5. The combination with a vapor converter, of a rotating electric motor, a gear device driven by said motor for tilting said converter, a plurality of circuits for energizing said motor, each of said circuits being provided with a contactor, one of said contactors being responsive to the electrical condition of said rectifier to close during the de-energization of said rectifier and open during said rectifier's operation and another contactor controlled by said gear device and being open only when said rectifier is in a predetermined position.

6. The combination with a space-current device having a fluid, vaporizable cathode member, of means including an auxiliary contact member adapted to make and break contact with said cathode member when tilting said device for producing an arc upon the surface of said cathode member, and actuating means for imparting to said device a slow motion when breaking contact and a relatively fast motion during the intervals between successive breaks.

7. The combination with a space-current device having a fluid, vaporizable cathode member, of means including an auxiliary contact member adapted to make and break contact with said cathode member when tilting said device for producing an arc upon the surface of said cathode member and actuating means for imparting a substantially harmonic tilting motion to said device, said actuating means being so arranged that the contact breaking occurs during the period of relatively slow movement of said device.

8. The combination with a space-current device having a fluid, vaporizable cathode member, of means including an auxiliary contact member adapted to make and break contact with said cathode member when moving said device for producing an arc upon the surface of said cathode member and actuating means for imparting a definitely restricted motion to said device, said motion comprising slow movement periods and fast movement periods, said actuating means being so arranged that the contact breaking occurs during a period of relatively slow movement of said device.

In testimony whereof, I have hereunto subscribed my name this 4th day of August, 1920.

EDGAR W. BREISCH.